(12) United States Patent
Stahl

(10) Patent No.: US 7,890,569 B1
(45) Date of Patent: Feb. 15, 2011

(54) TRACKING TIME USAGE ON A DISCONNECTED CLIENT OVER A PERIOD OF TIME

(75) Inventor: George Herbert Stahl, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 1306 days.

(21) Appl. No.: 11/239,773

(22) Filed: Sep. 29, 2005

(51) Int. Cl.
*G06F 15/16* (2006.01)
*G06F 21/00* (2006.01)
*G06F 7/04* (2006.01)

(52) U.S. Cl. .............................. 709/202; 705/59; 726/33
(58) Field of Classification Search ................. 709/202; 705/59; 726/33
See application file for complete search history.

(56) References Cited

U.S. PATENT DOCUMENTS

| 5,499,340 | A  | * | 3/1996  | Barritz .......................... 714/47  |
| 5,771,347 | A  | * | 6/1998  | Grantz et al. .................. 726/31 |
| 5,795,161 | A  | * | 8/1998  | Vogel .......................... 434/350 |
| 5,925,127 | A  | * | 7/1999  | Ahmad ......................... 726/31 |
| 6,122,663 | A  | * | 9/2000  | Lin et al. ..................... 709/224 |
| 6,173,446 | B1 | * | 1/2001  | Khan et al. .................. 717/127 |
| 6,502,079 | B1 | * | 12/2002 | Ball et al. ...................... 705/59 |
| 6,530,031 | B1 | * | 3/2003  | Randall et al. .............. 713/502 |
| 6,578,199 | B1 | * | 6/2003  | Tsou et al. ................... 717/178 |
| 6,915,278 | B1 | * | 7/2005  | Ferrante et al. ................ 705/59 |
| 2006/0106732 | A1 | * | 5/2006 | Coley et al. .................... 705/59 |
| 2006/0190752 | A1 | * | 8/2006 | Lee .............................. 713/323 |

* cited by examiner

*Primary Examiner*—Joon H Hwang
*Assistant Examiner*—Mark Pfizenmayer
(74) *Attorney, Agent, or Firm*—Fenwick & West LLP

(57) ABSTRACT

The tracking control module is adapted to track time usage (e.g., during a user's subscription to a particular service) on a disconnected client over a period of time with limited server interaction in a manner that is not likely to be affected by system clock changes. The module is designed to take an initial read when an executable associated with the service starts. As the program runs, the running time during the service life can be tracked by the module based on computer cycles that occur over the service life rather than on the system clock. In some embodiments, the system clock is only relied upon to track the time between service lives during which the program is asleep, thus minimizing the affect any system clock changes would have on the accuracy of the time estimate. The module adjusts the time left in the service period according to the time determinations.

18 Claims, 6 Drawing Sheets

TRACKING TIME USAGE ON A DISCONNECTED CLIENT OVER A PERIOD OF TIME

BACKGROUND OF THE INVENTION

1. Field of the Invention

This invention pertains in general to computer software service management, and more specifically to tracking usage of software applications over time.

2. Description of the Related Art

A number of software applications today require subscription to some type of service provider in order to effectively use many of the capabilities that the software applications have to offer. For example, many antivirus and other types of security software applications require subscription to a service to receive regular security updates (e.g., to receive the latest virus definitions or information about new viruses and other threats, to activate certain features of a software application for a user, etc.) that can be provided by a server managed by the company providing the security software.

Managing these types of multi-month or multi-year subscription services can be challenging, however. These subscriptions often must be tracked on a disconnected client machine with little or no server connection or interaction. Thus, relying on when the client computer connects to the server for subscription time tracking is frequently not an effective mechanism for getting regular time measurements.

Tracking of these types of subscriptions is also often performed using the local system clock on the computer to determine the local date and time for that machine and to track how much time has passed since the start of the subscription period. However, the local system clock on client computers is often not very reliable. The local date and time can sometimes be radically changed either by accident or in some cases the date/time may be tampered with. When a user has a subscription for a service and the user's system clock is modified in some manner, the subscription can be greatly affected. A user who has a valid subscription could possibly be denied service due to an internal system clock error which makes it appear as if the user's subscription has expired or that the subscription period has not yet begun.

In addition, a user who has a subscription that has actually expired may be given service for a longer period of time without being required to pay for this extra service. In fact, tampering with the system clock is one way by which a dishonest user can extend his or her subscription without having to bear the costs of this extension (e.g., a user can set his system clock back a few months right before the subscription is about to expire to gain extra months worth of free service).

These types of errors in the system clock time readings that cause subscription tracking issues can possibly be corrected by having the client computer connect to a licensing server associated with the service that is aware of the actual time. However, if numerous clients with system clock issues try to connect to a licensing server at a time, the server may go down due to all the problems in subscription tracking. For example, the licensing server could go down due to a malicious denial of service attack against the server (e.g., the attack results in the server being bombarded by clients trying to connect causing the server to go down). Thus, while the licensing server might be able to provide a more accurate tracking of the time that has passed in a service subscription period in many cases, it is better to have as little client-to-server interaction as possible.

Therefore, there is a need in the art for a reliable method of tracking time usage on a sometimes disconnected client computer over a period of time with limited server interaction in which the method is not hampered by problems encountered when relying on the client computer's local system clock.

DISCLOSURE OF INVENTION

The above need is met by tracking time usage during a service period (e.g., a time period associated subscription for a service). A start time recording module records a start time for the service period (e.g., the time/date upon which the subscription begins). One or more service lives (e.g., time periods during which the time tracking system or tracking control module is being executed) can occur during the service period. A cycle recording module records time elapsed during each of the one or more service lives based on number of computer cycles that occurred during each service life. Thus, the recording does not have to rely or rely entirely on the system clock for tracking time. A sleep time recording module records time elapsed between each of the one or more service lives based on time elapsed between a service life end time (e.g., a time reading taken before the service life ends) and a next service life start time (e.g., a time reading taken at the beginning of the next service life) for each of the one or more service lives. A determination module determines total time depleted from the service period based on total time elapsed during and between each of the one or more service lives. Finally, a time adjustment module adjusts time left in the service period based on the determination (e.g., depletes time from the service period).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
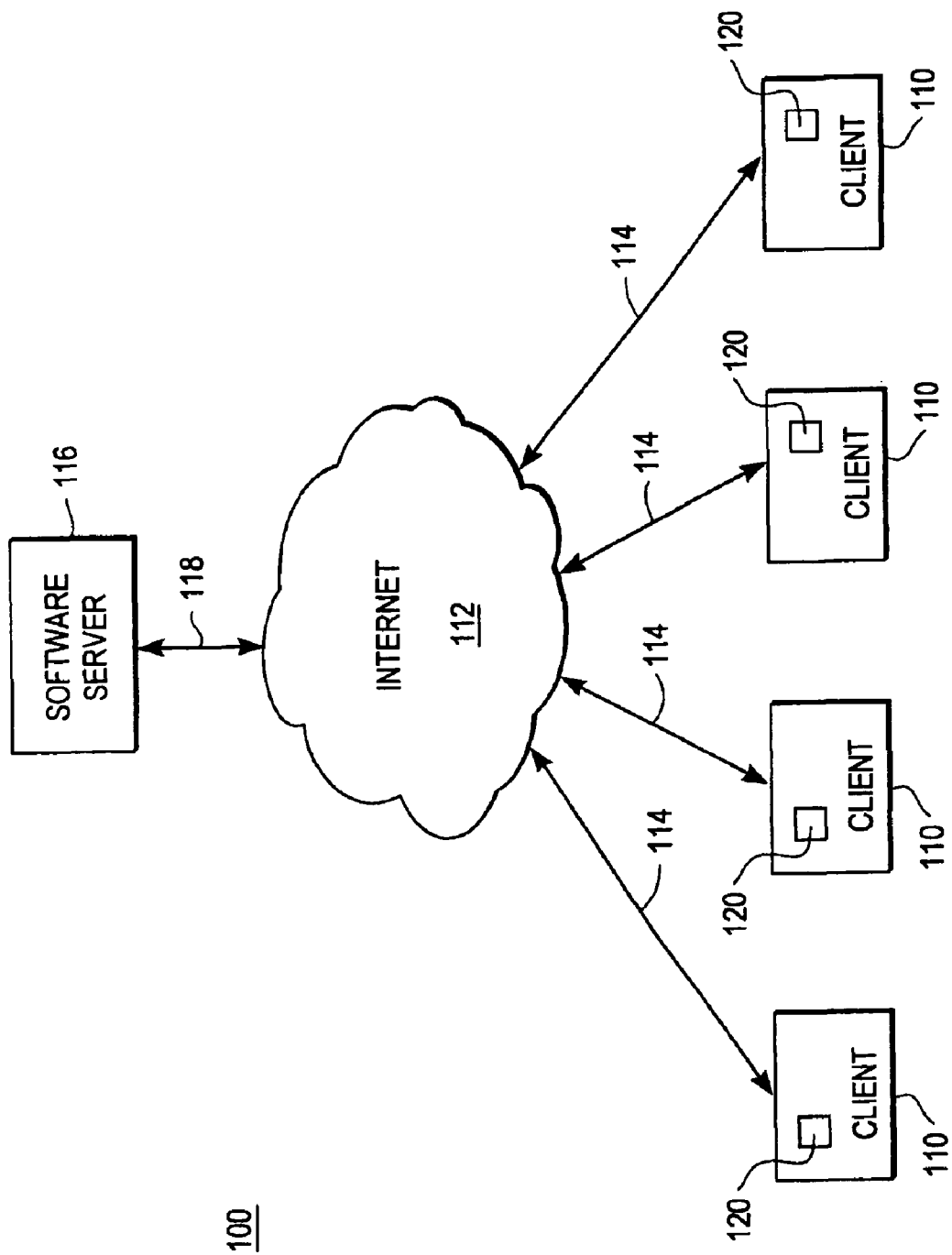
FIG. 1 is a high-level block diagram illustrating an example of a standard computing environment 100, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The tracking control module is adapted to track time usage on a disconnected client over a period of time with limited server interaction. For example, the tracking control module can be used to track the time passed during a user's subscription to a particular service where the subscription is set to last a specific period of time and where the user is sometimes or often not connected to a server associated with the service. The module is designed so that it does not have to rely (or not entirely rely) on the computer system clock for normal time tracking, as other time tracking systems often do, which puts them at risk of error if a problem occurs with the system clock (e.g., the clock is set forward or backward in time).

The tracking control module is designed to take an initial read (e.g., from the system clock, from a server, etc.) when an executable starts (e.g., the first time a user runs a particular program that is associated with a service subscription). This start time can be stored for providing information on the last system date/time read taken. As the program runs, the running time during the service life can be tracked by the module based on computer cycles (e.g., central processing unit or CPU cycles) that occur over the service life rather than on the system clock. Each time a new service life starts (e.g., each time the computer is restarted after being shut down for a period of time), an initial time reading (e.g., from the system clock) can be taken (i.e., since the computer could crash at any time and this could be the last reliable time reading taken before the crash).

In some embodiments, right before the program sleeps (e.g., when the computer is shut down), the tracking control module takes a last recording of the time/date from the system clock (e.g., because this reading is more likely to be accurate than the last system clock read taken). If the program is not put to sleep normally (e.g., if the computer crashes or some other type of system or program failure occurs) so the module could not take this last read, then the last measure of time can be determined from the last measure taken of the computer cycles occurring during the service life or the last system clock read taken (e.g., possibly the initial read taken at the beginning of the service life). When the program wakes back up, the module can take another initial system clock read and then continue to record depleted time over the next service life based on computer cycles. This pattern of tracking time during service lives and sleep cycles of the program can occur over the entire service period.

Since the time during which the program is awake (e.g., the service life) can be tracked based on computer cycles rather than on the system clock, any changes to the system clock that occur during the service life will not likely affect the total tracking of time in the subscription service period. In some embodiments, the system clock is only relied upon to track the time between service lives during which the program is asleep (e.g., by providing the ability to determine the time between the system clock read right before the program went to sleep and the system clock read right after the program woke up). Thus, the only system clock changes that would likely affect the time tracking for the subscription would be changes that occurred while the program was asleep. However, in some embodiments, the program is designed to launch immediately or soon after reboot of the computer and to run continuously while the computer is running until the computer is shut down or otherwise disabled. Thus, this minimizes the chance that a change in the system clock could occur during the sleep cycle of the program (since the computer is not running during this time). Therefore, the tracking control module allows for reasonably accurate tracking of time usage that is not likely to be affected by system clock errors and that is not reliant on server interaction.

As used herein, the term "service period" can include the time period for which tracking is desirable, including time periods over which any type of computer-associated service (e.g., a service associated with antivirus software, antispam software, etc.) is provided to a user. This can also include the time period provided by the user's subscription to a particular service, the time period over which the user can use a particular software application or over which the user has access to certain features of a software application, the time period over which a user can download certain information over the Internet (e.g., virus definitions, etc.), and other similar limited time periods. As used herein, the term "service life" can include the time during which a particular program is running or being executed on a computer (e.g., while a computer is running or is awake, etc.). As used herein, the term "sleep cycle" or "sleep time" can include the time during which a particular program is asleep (e.g., the computer is turned off, the computer is hibernating, the program itself is not currently being executed on the computer, etc.).

As used herein, the term "computer cycle" can include any type of provision of a relative measure of time during which the CPU is active. For example, it is possible to measure the difference in the actual number of clock cycles during which the CPU is operating, and these cycles can be converted into an actual measure of time by knowing the number of computer cycles per second at which the computer is operating at a given time. As another example, on any given system, there may also be calls that allow the measuring of elapsed computer cycle time in a manner that is more human-friendly (e.g., an operating system call "Sleep(1000)," which means sleep for 1000 milliseconds). Using such a system call, elapsed time can be determined in a wide variety of hardware and software operating environments since it is possible to rely on the operating system or supporting software to accurately sleep for a period of time (e.g., 1000 milliseconds) and/or provide an indication of when a requested time interval (e.g., 1000 milliseconds) has elapsed. As another example, using a Microsoft® call, such as "WaitForSingleObject(hShutDown, 10000)," the tracking control module can wake up every 10 seconds and deplete 10 seconds from the total service period time (e.g., there are 216000 seconds in a day, 21600 10-second chunks in a day, 2160 100-second chunks in a day, etc.)

FIG. 1 is a high-level block diagram illustrating a computing environment 100 according to an embodiment of the present invention. Multiple client computers 110 are in communication with the Internet 112 or other network, such as a local area network, wide area network, etc. via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having connectivity to remote update sources, such as cellular telephones, personal digital assistants (PDAs), etc. A server 116 is also connected to the Internet 112 via a communications link 118.

As is known in the art, the client computers 110 preferably execute an operating system and one or more application programs. The operating system controls the operation of the computer system, and some examples of such an operating system include LINUX®, one of the versions of MICROSOFT WINDOWS®, PALM OS®.

In FIG. 1, each client computer 110 is connected to the Internet via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, Bluetooth, or mobile phone (e.g., CDMA or GSM) network, satellite downlink, uplink, or bi-directional link, etc. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send information, such as information associated with a service subscription, across the Internet 112 and to the client computers 110. In some embodiments, the server 116 is a licensing server associated with a particular service subscription. In some embodiments, the client computer 110 connects only occasionally (possibly only once or twice over a service period) to the server 116. In some embodiments, when the client 110 connects to the server 116, the server 116 provides a reliable reading of the current time and date to the tracking control module 120 that can be used for time usage tracking during a service period. Additionally, the client computers 110 can send out information or make requests (e.g., the tracking module 120 can request information about the current time/date, etc.) across the Internet 112 to the server 116 or to other computers 110. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes a tracking control module 120 for tracking time usage during a service period on the client computer 110. The tracking control module 120 can be a discrete application program, or the module 120 can be integrated into another application program or the client computer's 110 operating system. In some embodiments, the module 120 is incorporated in the program associated with the service (e.g., the licensed program/service). However, the module 120 can also be a second program separate from the first program associated with the service, and this second separate program can run alongside the first program and conduct time tracking during the service period. In some embodiments, a portion of the tracking control module 120 is executed on the server 116. In some embodiments, the server 116 is associated with a vendor providing service (e.g., security protection service, such as that provided through the use of antivirus software) to the clients 110. Though the clients 110 are shown as being connected to the Internet 112, in some embodiments the clients 110 are only connected to the Internet 112 for a portion of the service period or are not connected to the Internet 112 at all during the service period. Other modifications can be made to accommodate any of the other numerous embodiments of the tracking control module 120 for tracking time usage of a client computer 112 during a service period.

Figure 2:
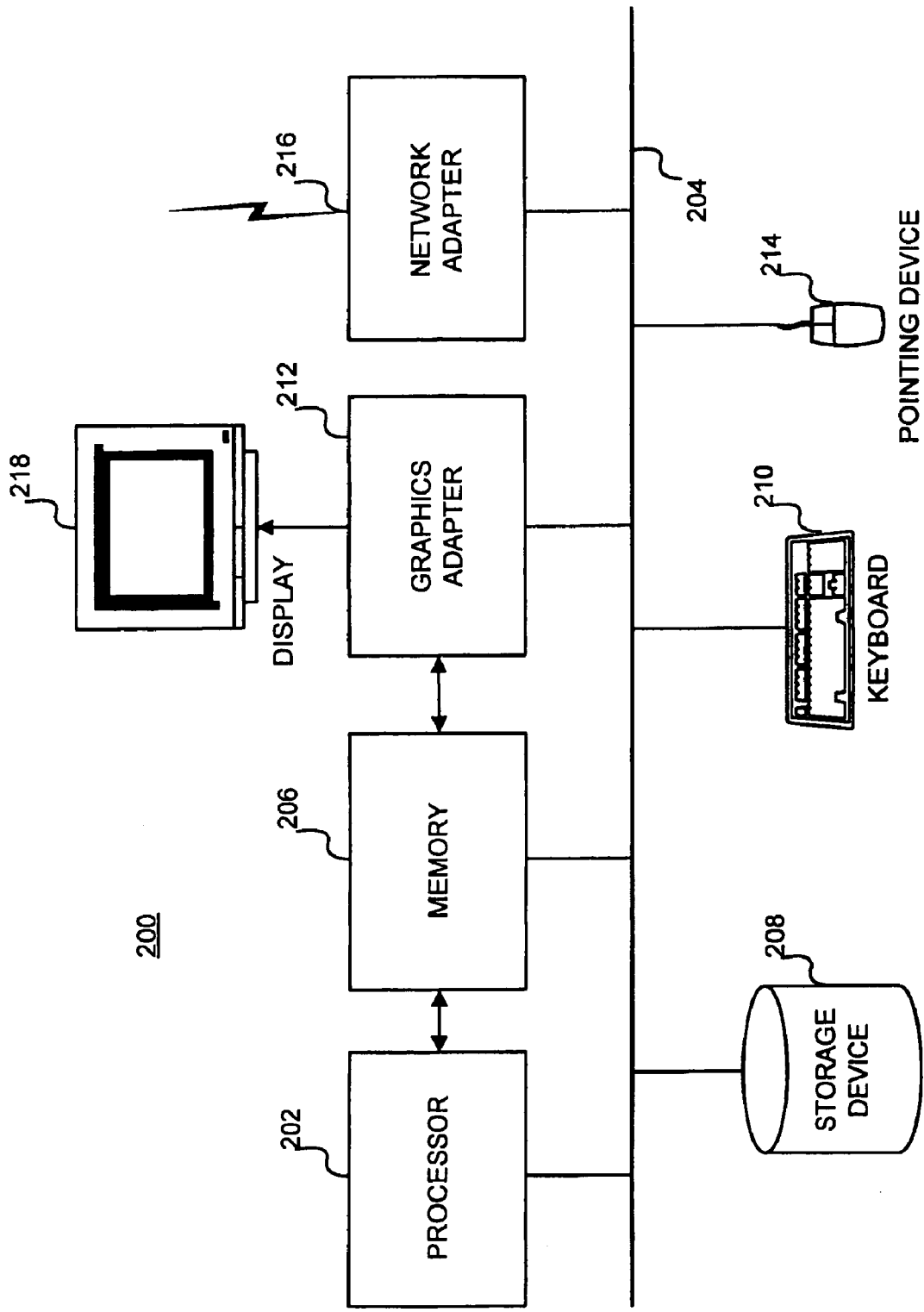
FIG. 2 is a high-level block diagram illustrating a standard computer system 200 for use with the present invention.

FIG. 2 is a high-level block diagram illustrating a functional view of a typical computer system 200 for storing and executing the tracking control module 120, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a non-transitory computer-readable storage medium such as the storage device 208, loaded into the memory 206, and executed by the processor 202. Alternatively, hardware or software modules may be stored elsewhere within the computer system 200.

Figure 3:
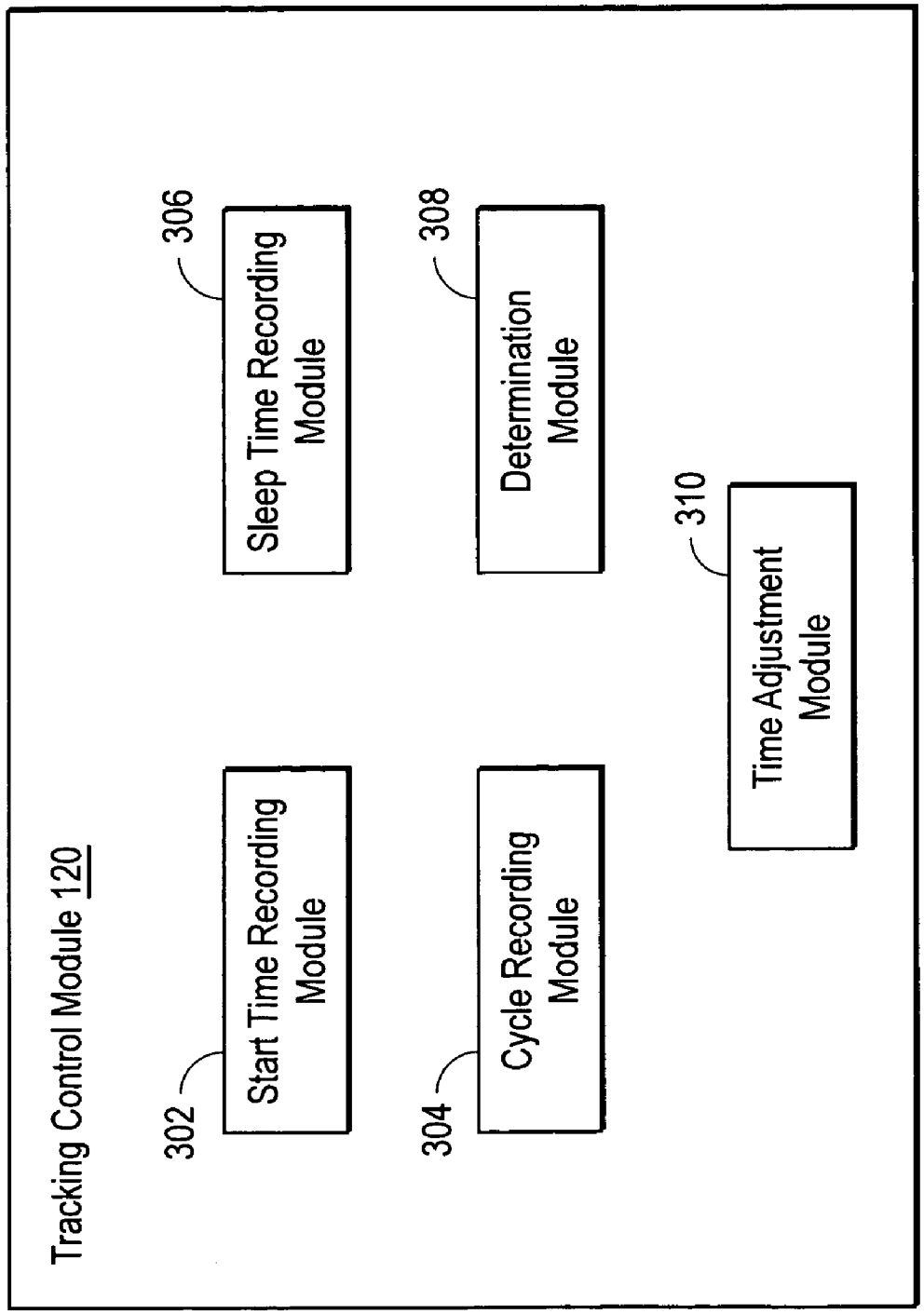
FIG. 3 is a high-level block diagram illustrating the functional modules within the tracking control module 120, according to one embodiment of the present invention.

FIG. 3 is a high-level block diagram illustrating the functional modules within the tracking control module 120, according to one embodiment of the present invention. The tracking control module 120, in the embodiment illustrated in FIG. 3, includes a start time recording module 302, a cycle recording module 304, a sleep time recording module 306, a determination module 308, and a time adjustment module 310. Those of skill in the art will recognize that other embodiments can have different and/or additional modules than those shown in FIG. 3 and the other figures. Likewise, the functionalities can be distributed among the modules in a manner different than described herein.

The start time recording module 302 records a start time for the service period (e.g., the time/date at which the user's service or subscription period begins). One or more service lives (e.g., the time during which the tracking control module 120 is being executed) occur during the service period and there can also be sleep cycles between the service lives. In some embodiments, the start time for the service period is provided by a trusted server 116 (e.g., a licensing server associated with the subscription for a particular service) or is otherwise recorded when the user signs up for a particular service. In some embodiments, the start time is recorded based on a reading taken from the computer 110 system clock. In some embodiments, the start of the service period is marked from the time the user first registers for a service (e.g., upon signing up for a service on a webpage, upon making payment for the service, upon sending an email requesting a service, etc.). The service period start time can be equivalent to the start time of the first service life. In some embodiments, this service period start time and first service life start time will be marked by the first time the user executes the program associated with the service (e.g., the user may have just downloaded the program off of the Internet 112, inserted a disk into the computer to install the program, clicked on an icon to start a program that is associated with the service, etc.).

In some embodiments, the start time is recorded by taking a record of the time and/or date using the computer system clock. This record can be stored for later usage. In some embodiments, this start time record is later used in determining time usage over the service period since the start time record provides a record of the beginning of the service period (and can provide a record of the beginning of the first service life).

In some embodiments, the module 302 also records the total time for the service period (e.g., the total subscription time). This total time can be recorded in second, minutes, hours, days, weeks, months, years, and the like. For example, the start time recording module 302 can record a service period of 365 days if a user has subscribed to a 1-year service. In some embodiments, the total service period time is provided by a trusted server 116 (e.g., a licensing server associated with the subscription for a particular service) or is otherwise recorded when the user initially signs up for a particular service.

In addition, time may be recorded by the various modules described herein in a number of ways, including recording the system clock time and/or date, recording system or computer cycles, recording local time and/or date, and the like. Furthermore, multiple time recording methods can be used by different modules in the same embodiment, and one module can use more than one time recording method.

A cycle recording module 304 records time elapsed during each of the one or more service lives based on number of computer cycles that occurred during each service life. In some embodiments, the module 304 records the number of computer cycles that occur from the time the program associated with the service period is executed to the time the execution of the program ends. For example, the module 304 can record cycles starting from when the computer 110 is started up (e.g., during a reboot) to the time the computer 110 is shut down, crashes, or operations are otherwise ended In some embodiments, the module 304 executes as soon as the computer 110 starts up or soon after the computer 110 starts up (e.g., during the boot phase or other device startup phase, initiation of the operating system, etc.). In some embodiments, the module 304 executes based on some other cue not necessarily linked to the start up of the computer 110 (e.g., based on start up of a particular program, based on user command, based on connection to a server 116, based on a preset time schedule or predetermined start time, etc.). In some embodiments, the cycle recording module 304 can record cycles from the start of the service period or the start time recorded by the start time recording module 302.

The cycles (e.g., central processing unit or CPU cycles, or other types of computer cycles) recorded by the cycle recording module 304 during each service life can be used to determine the amount of time that has passed during a service period. Each cycle can be equal to a particular increment of time, and these increments of time can be added up to get an overall determination of the time that has passed during a service life. The time passed during each service life can be added together to get an overall estimate of the total service life time that has passed during the service period (e.g., the overall time during which the tracking control 120 module was being executed on the computer). In some embodiments, the cycle recording module 304 keeps a running count of the time that has passed by adding time to the total number each time a cycle is counted. In other embodiments, the module 304 simply records each cycle without keeping a running total of the time usage from the beginning of the service life.

A sleep time recording module 306 records time elapsed between each of the one or more service lives (e.g., the sleep cycle) based on time elapsed between a service life end time and a next service life start time for each of the one or more service lives. In some embodiments, the module 306 records the service life end time (e.g., from the system clock or from the last computer cycle before the service life ends) for each of the one or more service lives. In some embodiments, the sleep time recording module 306 takes a time and/or date reading from the computer 110 system clock right before a service life ends (e.g., when the computer is shut down, hibernated, or the execution of the tracking control module 120 is otherwise ended). For example, if the computer 110 is shut down normally, then this last recording of time can be done by the module 306 to mark the end of the service life and the beginning of the sleep time or sleep cycle for the tracking control module 120.

If the execution of the tracking control module 120 ends due to a computer crash or other type of system malfunction or program malfunction, there may not be time for the sleep time recording module 306 to take a last system clock recording before the service life ends. In this case, the sleep time recording module 306 may use the last system clock reading taken as the service life end time or may use the last computer cycle recording taken by the cycle recording module 304. In these embodiments, the module 306 can record a service life end time by getting information about the last computer cycle that occurred from the cycle recording module 304 right before the service life ended or by getting the total amount of time that passed in the service life from the module 304 (e.g., if the module 304 keeps a running total of time passage during a service life). In some embodiments, the sleep time recording module 306 will not have time to get this information from the cycle recording module 304 before the service life ends (e.g., due to a computer crash), so the sleep time recording module 306 can determine the end time when the sleep cycle ends and the next service life begins.

In some embodiments, the sleep time recording module 306 also records a next service life start time (e.g., the time at which a next service life starts, following the previous service life). In some embodiments, this start time recording procedure of the module 306 works in a manner similar to the service period start time recording done by the start time recording module 302. In some embodiments, the next service life start time is recorded by taking a reading of the time and/or date at or near the beginning of the service life using the computer 110 system clock. In other embodiments, the next service lift start time is determined based on the first computer cycle in the service life.

The sleep time or the time between one service life and a next service life can be determined by calculating the amount of time elapsed between the service life end time and the next service life start time. In some embodiments, the sleep time recording module 306 uses the service life end time and the next service life start time to determine the total time elapsed during each sleep cycle occurring during a service period. The total sleep time can be used in the determination of the total time depleted in the service period.

As described above, the tracking control module 120 can be designed to start execution as soon as the computer 110 starts up and can continue running until the computer 110 is shut down. Due to this, the sleep time recording module 306 can use the system clock in its readings for calculation of the sleep time, since the system clock readings are taken right before the computer 110 is shut down (if possible) and right as the computer 110 starts up. The chance of a system clock malfunction or of tampering during these brief portions of the service period (e.g., at reboot and shut down of the computer) is small, thereby minimizing inaccuracy in time tracking due to system clock problems. When the tracking control module 120 is actually running, time can be kept by tracking computer cycles with the cycle recording module 304. Thus, the system clock problems will not affect time keeping while the module 120 is running.

The tracking control module 120 can also function in the same manner when the computer 110 is hibernated or is otherwise rests or stands by, since the hibernation/rest phase can be treated as a sleep cycle. The module 120 can be designed to recognize or receive notification when the computer 110 is being hibernated, and can take a time/date reading before and after the hibernation/rest occurs. Thus, the module 120 can shut down when the computer 110 hibernates/rests and the module 120 can again start running when the computer 110 woken up from hibernation/rest. The cycle recording module 304 can record computer cycles while the computer 110 is awake and the sleep time recording module 306 can take a time/date reading before and after the hibernation occurs. If the tracking control module 120 continues running while the computer 110 is resting (e.g., during standby of the computer 110), the cycle recording module 304 can continue recording cycles, as described above.

A determination module 308 determines total time depleted from the service period based on total time elapsed during and between each of the one or more service lives. In some embodiments, the module 308 acquires records of time elapsed during each service life (e.g., from the cycle recording module 304 or from storage) and records of the time elapsed between service lives (e.g., from the sleep time recording module 306 or from storage). The determination module 308 can add the total service life time elapsed to the total sleep cycle time elapsed to get an estimate of the total amount of time elapsed during the service period. In some embodiments, the module 308 keeps a running calculation of the time elapsed by regularly acquiring time elapse information (e.g., from modules 304 and 306) and determining a running total of time depletion from the service period. In other embodiments, the module 308 calculates the time depletion from the service period every once in a while (e.g., once every few minutes, once a day, once a week, once a month, etc.). As described above, in some embodiments, the cycle recording module 304 keeps a running total of time elapsed in service lives (and can even keep a running total of time elapsed over numerous service lives) and the sleep time recording module 306 keeps a running total of time elapsed between service lives (or over numerous sleep cycles). In these embodiments, the determination module 308 acquires the totals and can add them together (if they have not already been added), and the module 308 will have little work to do to keep track of total time depleted in the service period.

In some embodiments, the determination module 308 also uses the service period start time recorded by the start time recording module 302 in calculating total time elapse in the service period. For example, if the service period is to last 365 days, the determination module 308 can estimate how many of the 365 days (or hours, minutes, seconds, etc.) have passed based on the time recordings taken by modules 302, 304, and 306.

A time adjustment module 310 adjusts time left in the service period based on the determination of the determination module 308. In some embodiments, the module 310 decreases the amount of time left in a user's service period according to the time calculations provided by the determination module 308. For example, in a 365-day subscription to a service in which the determination module 308 has determined that 300 days have passed, the time adjustment module 310 will deduct 300 days from the total service period. In some embodiments, the adjustment done by module 310 is done regularly throughout the service period as time recordings are done by module 304 and 306. In other embodiments, the adjustment is done every once in a while (e.g., every few minutes, every few hours, every day, every week, every month, etc.).

When the user has reached the end of the service period, the time adjustment module 310 can cause the service to stop. In some embodiments, the program associated with the service or particular features of the program stop running once the module 310 determines the service period has ended. In some embodiments, the module 310 will notify a server associated with the service, if possible, that the service period has ended.

In some embodiments, the module 120 is designed to use the system clock for all of the time tracking (including during service lives), but the module 120 records the system time/date over predetermined intervals (e.g., every second, every minute, etc.). If the system clock is suddenly radically changed giving a time reading much earlier or later than the time reading taken for the previous interval, the module 120 can be designed to recognize this discrepancy in the intervals and make a correction to the time tracking.

In some embodiments, the tracking control module 120 uses other mechanisms for acquiring time information during a service period to either supplement the methods described above, or as an alternative. If the tracking control module 120 ever has access to a reliable time estimate during a service period (e.g., through a server, via a digitally signed file, via any other file stored on the computer that includes a date, etc.), the module 120 can use this trusted time reading to correct any miscalculations that may have occurred using the procedures described above. For example, the module 120 can use the procedures described above or other procedures to determine that 10 days out of a 100-day service period have been depleted, where the 100-day service period started on Jul. 1, 2005. However, the module 120 may determine through a digitally signed and dated file that at least 30 days have actually passed, since the dated file lists a date of Aug. 1, 2005. The tracking control module 120 knows the service period start time (e.g., Jul. 1, 2005), as recorded by the start time recording module 302, which is a reliable mark of the starting point in time for the service period. Thus, the tracking control module 120 can rely on the more trusted time provided by the digitally signed file and can correct the inaccurate 10-day depletion and deduct another 20 days to make a total of 30 days from the start time as recorded by the start time recording module 302. It is possible that the Aug. 1, 2005 file may actually be out of date (it may really be Sep. 1, 2005), but this is the best time estimate available to the module 120 that shows that at least 30 days must have passed since the start time. In some embodiments, the module 120 will only delete days from the service period using this method, but will not add days to the service period. In other embodiments, the module 120 only adds days or both adds and deletes days from the service period using this method.

Another correction technique that can be used by the tracking control module 120 is a server synchronization. According to this technique, the module 120 will acquire a reliable time reading from a server 116 when the client computer 110 connects to the Internet 112 and connects to the server 116. The module 120 can then correct the time depleted from the service period. For example, in a 200-day service period, if the tracking control module 120 had determined using procedures described above that 10 days had been depleted, but the module 120 determines from a server 116 that actually 50 days have passed, the module 120 can make the correction and deduct 40 more days.

In some embodiments, the client computer 110 automatically requests a time reading from the server 116 associated with the service every time the client 110 connects to the server 116 (or every time the client 110 connects to the Internet 112). In some embodiments, the client 110 only requests a time reading from the server 116 every once in a while (e.g., every few days, every week, every month, every year, etc.). However, to avoid having numerous clients 110 continually requesting time readings from the server 116 and thus using up a large amount of server 116 bandwidth (e.g., in a denial of service attack against the server), the user can also manually connect to the server 116 whenever such a time reading is needed (e.g., the user discovers a problem with the clock, the service period ends before the user believes it should have, the module 120 determines that a trusted time reading should be obtained, etc.). For example, the module 120 can require that a user connect to the server 116 if it is determined by the module 120 that a reliable time reading is needed (e.g., the module 120 suspects a system clock error, the module 120 has reason to believe the time tracking has been inaccurate, etc.). It is also possible for the module 120 to receive time readings passively from the server 116, without request. In some embodiments, the server synchronization only occurs when a user's service period ends. If the service period ended prematurely (e.g., the user should have another 100 days), the server 116 can then make the time adjustment and give back the lost time to the user (e.g., add back the 100 days to the service period). For example, the module 120 can be designed to notify the user when the end of the service is reached, and the user can connect to the server 116 if the module 120 time tracking is incorrect. Thus, in these embodiments, server 116 traffic is minimized by only requiring synchronization with a trusted server when a time reading is needed.

One of ordinary skill in the art will recognize that there are numerous ways by which time can be calculated using the tracking control module 120. For example, time can be calculated via a system hardware clock that can be set through the BIOS or a system software clock such as the time reported by the operating system. Time can also be calculated using files including system files that are touched or accessed on a regular basis, files including system files that have a sequential series of time stamps written to them (e.g., system log files), and the like. In addition, time can be calculated using a combination of any of these approaches (e.g., since it might be difficult for someone to change more than one or all of these time measure mechanisms coherently at the same time, either purposefully or accidentally).

Figure 4:
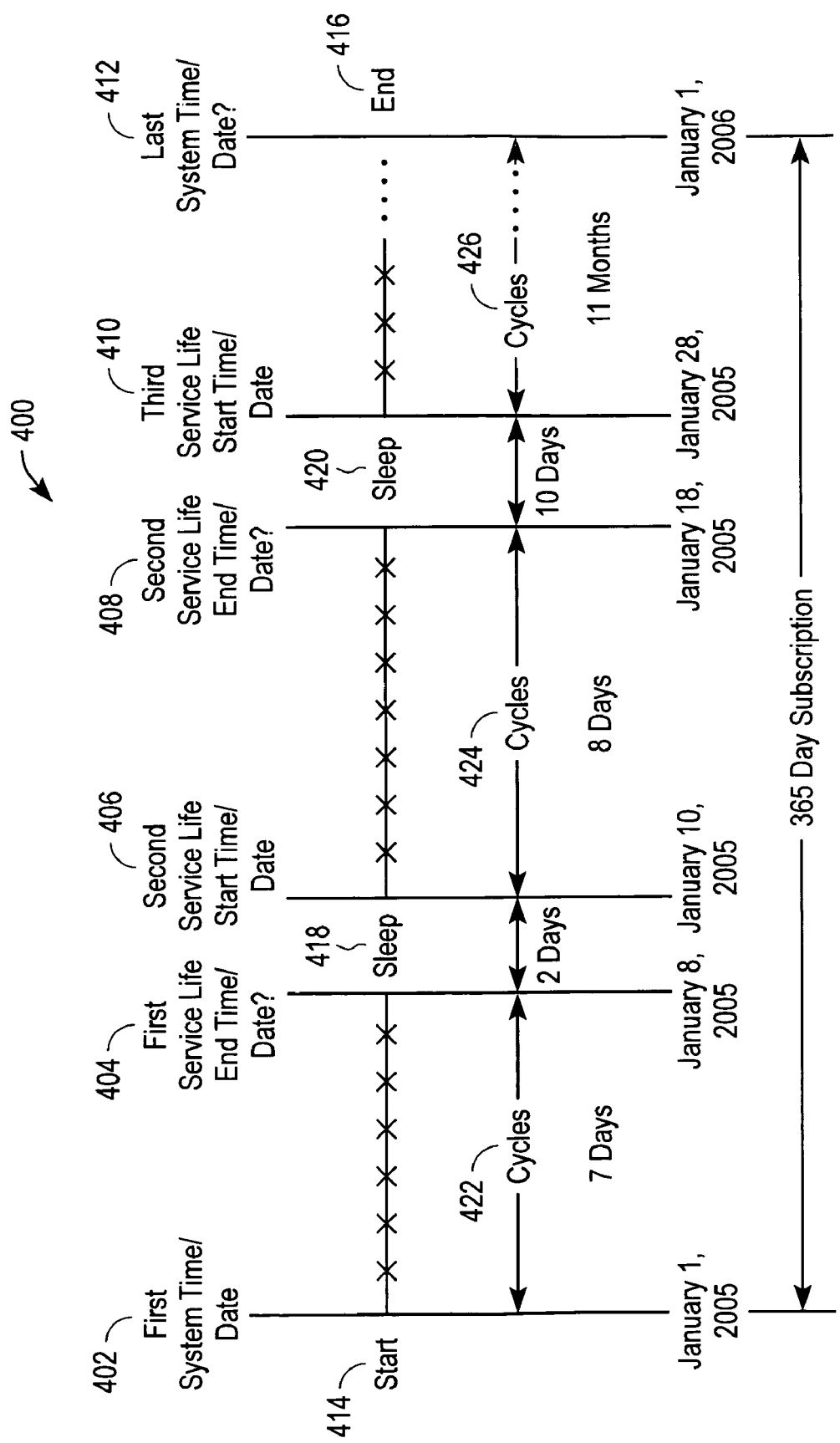
FIG. 4 is an illustration of an example of timeline showing a service period, according to one embodiment of the present invention.

Referring now to FIG. 4, there is shown an illustration of an example of timeline 400 showing a service period, according to some embodiments of the present invention. In the example of FIG. 4, the service period is a one-year period running from Jan. 1, 2005 to Jan. 1, 2006. The start time/date 414 is determined by taking a read of the first system time/date 402 (e.g., via a server, via the computer system clock, etc.). In the example of FIG. 4, the first system date and start time for the service period is Jan. 1, 2005. This may be the date that the service was first subscribed to, that the tracking control module 120 was first executed, etc. The module 120 continues to run for a period of time (e.g., 7 days according to the FIG. 4 example) and the number of computer cycles 422 that pass during this period of time are recorded. The time that elapses while the module 120 is running (based on cycles) can be deducted from the service period.

The timeline 400 also illustrates a first sleep cycle 418. The module 120 stops execution (e.g., the computer is shut down) on Jan. 8, 2005, in the FIG. 4 example. A first service life end time/date 404 is taken right before the module 120 stops executing, if possible, and a second or next service life start time/date 406 is also recorded. The module 120 can determine how long the sleep cycle lasted by determining the time elapsed between the first service life end time/date 404 and the second service life start time/date 406 (e.g., 2 days). In the FIG. 4 example, the module 120 is woken back up on Jan. 10, 2005. Thus, in this example, the sleep cycle 418 lasted for 2 days, and 2 days can be depleted from the service period.

Once the module 120 is woken back up and starts running again to start a second service life, the module 120 tracks the computer cycles 424 that occur until the next sleep cycle 420. In the FIG. 4 example, 8 days pass by until the module 120 is again put to sleep on Jan. 18, 2005. A second service life end time/date 408 is taken if possible before the module 120 is put to sleep, and a third service life start time/date 410 is taken as soon as the module 120 wakes back up. The module 120 can determine that 10 days have passed (e.g., Jan. 28, 2005) by calculating the time elapsed between time/dates 408 and 410, and another 10 days can be depleted from the service period (making a total of 27 days depleted total from the service period).

Again, once the module 120 wakes up, for a third service life, the module 120 records the cycles 426 that pass by until another sleep cycle occurs or until the module determines that it is the end 416 of the service period. In some embodiments, a last system time/date 412 is taken (e.g., on Jan. 1, 2006) when the service period ends. In some embodiments, server synchronization can be used to determine whether or not the end time/date 416 is correct, and the server 116 can add extra time to the user's service period if the service ended prematurely (e.g., before the subscription time was up). For example, if the server 116 determines that it is really Dec. 1, 2005, and not yet Jan. 1, 2006, the server 116 can add an extra 30 days to the service period. If at any time the module 120 discovers evidence (e.g., via a digitally signed file, etc.) that more days have passed than the module has recorded, the module 120 can make a time adjustment. For example, if after the module 120 has determined that 7 days have passed, and it is currently Jan. 8, 2005, and then the module 120 finds evidence that it is really Feb. 8, 2005, the module 120 can deduct an extra month from the service period. The module 120 can then again begin the time tracking shown in FIG. 4 starting from the new and more reliable date reading of Feb. 8, 2005.

Figure 5:
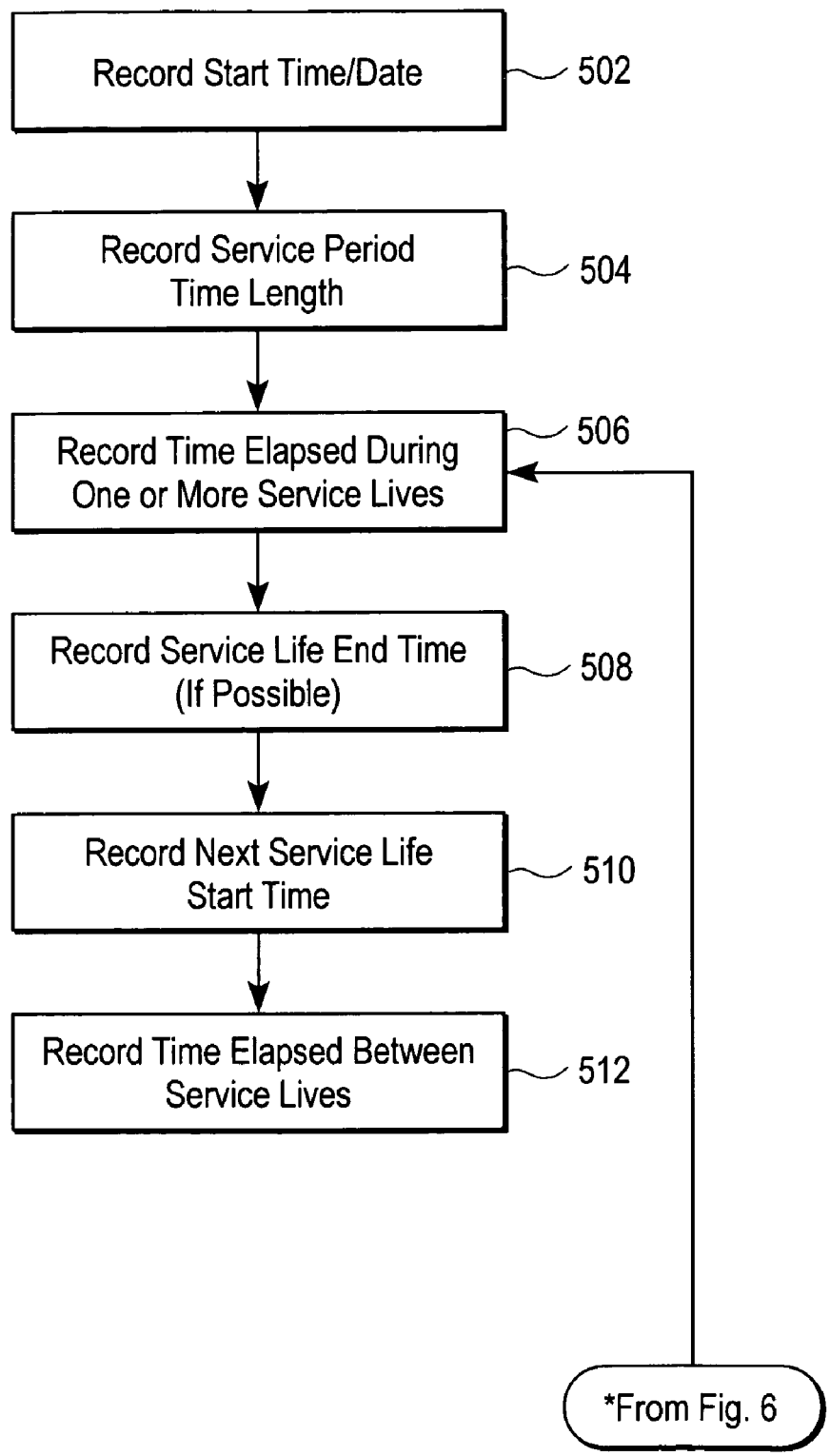
FIG. 5 is a flowchart illustrating steps performed to track time usage over a service period, according to one embodiment of the present invention.

Referring now to FIG. 5, there is shown a flowchart illustrating the operation of the tracking control module 120, according to some embodiments of the present invention. Specifically, FIG. 5 illustrates the steps performed to track time usage over a service period using the tracking control module 120. It should be understood that these steps are illustrative only. Different embodiments of the tracking control module 120 may perform the illustrated steps in different orders, omit certain steps, and/or perform additional steps not shown in FIG. 5 (the same is true for FIG. 6).

As shown in FIG. 5, the tracking control module 120 can record 502 the start time/date (e.g., from a system clock, from a server, etc.). The module 120 also can record 504 the service period time length (e.g., a 365-day service period). The service period length can be provided by a licensing server 116 associated with the subscription or from another source. Once the service period starts and the module 120 is running, the module 120 can then begin to record 506 time elapsed during one or more service lives. The module 120 can record 506 the number of computer cycles that occur over the service life, and this can be used to keep track of the amount of time that should be deducted from the user's service period.

In some embodiments, a sleep cycle can also occur in which the module 120 is put to sleep for a period of time. If possible, the module 120 can record 508 (e.g., by taking a system clock reading not long before the module 120 goes to sleep) a service life end time (e.g., the time at which the first service life ends). When the module 120 wakes back up, it can record 510 (e.g., by taking a system clock reading) a next service life start time (e.g., the time at which the second service life starts). Thus, the module 120 can record 512 the time elapsed between service lives by determining the time elapsed between the service life end time and the next service life start time.

Figure 6:
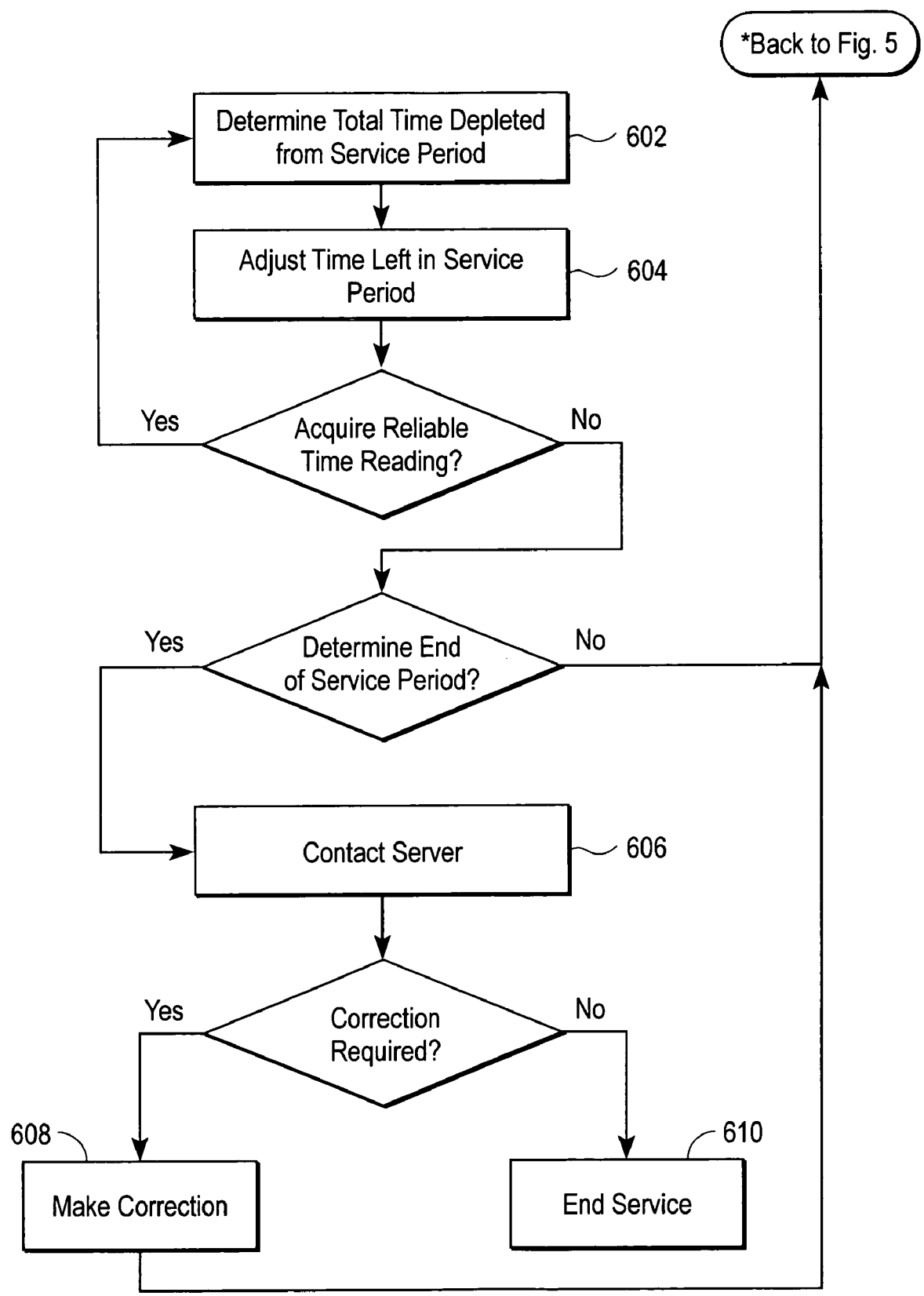
FIG. 6 is a continuation of the flowchart of FIG. 5 illustrating steps performed to track time usage over a service period, according to one embodiment of the present invention.

Referring now to FIG. 6, there is shown a flowchart illustrating the operation of the tracking control module 120, according to some embodiments of the present invention. Specifically, FIG. 6 illustrates the steps performed to track time usage over a service period using the tracking control module 120, including the determination of time depleted and time adjustment.

The tracking control module 120 can also determine 602 the total time depleted from the service period. In some embodiments, the module 120 can make this determination by adding the time elapsed during each service life to the time elapsed during sleep cycles, to get a total amount of time elapsed. The module 120 can adjust 604 the time left in the service period based on the determination. Either one or both of the determination 602 and time adjustment 604 steps can occur throughout the process as time as being depleted (e.g., a running total of time depleted from the service period can be kept). It is also possible for steps 602 and 604 to occur only once in a while throughout the process or at the end of the process.

The module 120 can also determine whether or not it has acquired a reliable time reading. However, this is an optional step and is not required. In some embodiments, the module 120 regularly searches or continuously monitors for any time/date information available on the client 110 (e.g., via a digitally signed file, a time stamp on a modified Word document, via a software patch or update, via a server, etc.). If a reliable time reading is acquired, the module 120 can then determine 602 the time depleted and adjust 604 the time, if necessary (e.g., if the reliable time reading shows that the readings done by the module 120 so far are inaccurate). If no reliable time reading is found, the module 120 can determine if the end of the service period has been reached. In some embodiments, the module 120 monitors regularly for the end of the service period. If the end of the period has not been reached, the module 120 continues to record 506 time elapsed during service lives and make recordings according to steps 508, 510, and 512, where appropriate (see FIG. 5).

If the service period has ended, the module 120 can optionally contact 606 a server 116 (e.g., a licensing server associated with the subscription to the service) and a server synchronization can be conducted. In some embodiments, the server 116 provides a reliable time/date reading to the module 120 and the module determines if correction is required. In other embodiments, the module 120 provides its current time/date estimate to the server 116 and the server 116 determines if the estimate is correct and the service period has really ended. If no correction is required and the module 120 correctly determined that the service period ended, the service can then be ended 610. If correction is required, the correction can be made 608 by the module 120 or the server 116 (e.g., the lost time can be added back to the service period or extra time can be depleted), and the module can again track time according to steps 506, 508, 510, 512, etc., until the service period ends.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. A computer program product having a non-transitory computer-readable storage medium storing executable computer program instructions for tracking time usage of an application on a computer during a service period, the computer program instructions comprising instructions for:

recording a start time for the service period of the application, wherein a plurality of service lives of the application occur during the service period, the service period being a preset time period provided by a subscription associated with the application;

recording time elapsed during each of the service lives based on a number of computer cycles that occurred during each service life;

recording time elapsed between each of the service lives based on time elapsed between a service life end time and a next service life start time for each of the service lives, the recorded time elapsed between each of the service lives comprising a sleep cycle for the application during which the application is not being executed;

determining total time depleted from the service period of the application based on total time elapsed during and between each of the service lives; and adjusting time left in the service period of the application based on the determination.

2. The computer program product of claim 1, further comprising recording the service life end time and the next service life start time based on computer system clock readings.

3. The computer program product of claim 1, wherein recording the time elapsed between the service lives further comprises calculating the time elapsed between a last computer cycle in one service life for the application and the next service life start time for the application.

4. The computer program product of claim 1, wherein the service lives are time periods during which the application is executed on the computer.

5. The computer program product of claim 1, wherein determining total time depleted from the service period further comprises calculating a total amount of time passed during each of the service lives plus total amount of time elapsed between each of the service lives over the service period starting from the start time.

6. The computer program product of claim 1, wherein adjusting time left in the service period further comprises deducting time from the preset time period equal to the determined amount of time elapsed during and between the service lives.

7. The method of claim 1, wherein recording time elapsed between each of the service lives further comprises taking a time reading immediately before the service life ends, the sleep cycle comprising time during which the computer is turned off or hibernating.

8. A method of tracking time usage of an application on a computer during a service period, the method comprising:

recording a start time for the service period of the application, wherein a plurality of service lives of the application occur during the service period, the service period being a preset time period provided by a subscription associated with the application;

recording time elapsed during each of the service lives based on a number of computer cycles that occurred during each service life;

recording time elapsed between each of the service lives based on time elapsed between a service life end time and a next service life start time for each of the service lives, the recorded time elapsed between each of the service lives comprising a sleep cycle for the application during which the application is not being executed;

determining total time depleted from the service period of the application based on total time elapsed during and between each of the service lives; and adjusting time left in the service period of the application based on the determination.

9. The method of claim 8, further comprising adjusting time left in the service period based on a time reading acquired from a file including a time stamp stored on the computer.

10. The method of claim 8, further comprising adjusting time left in the service period based on a time reading acquired during a server synchronization.

11. The method of claim 8, wherein recording time elapsed during each of the service lives based on number of computer cycles further comprises using the computer cycles to track time usage during the service lives without relying on a system clock for the computer.

12. The method of claim 8, further comprising:

recording the service life end time and the next service life start time based on computer system clock readings; and determining amount of time elapsed between the service life end time and the next service life start time using the system clock readings.

13. The method of claim 8, wherein determining total time depleted from the service period further comprises calculating total amount of time passed during each of the service lives plus total amount of time elapsed between each of the service lives over the service period starting from the start time.

14. A system for tracking time usage of an application on a computer during a service period, the system comprising:

a non-transitory computer-readable storage medium configured to store software modules comprising:

a start time recording module that records a start time for the service period of the application, wherein a plurality of service lives of the application occur during the service period, the service period being a preset time period provided by a subscription associated with the application;

a cycle recording module that records time elapsed during each of the service lives based on a number of computer cycles that occurred during each service life;

a sleep time recording module that records time elapsed between each of the service lives based on time elapsed between a service life end time and a next service life start time for each of the service lives, the recorded time elapsed between each of the service lives comprising a sleep cycle for the application during which the application is not being executed;

a determination module that determines total time depleted from the service period of the application based on total time elapsed during and between each of the service lives;

a time adjustment module that adjusts time left in the service period of the application based on the determination;

a processor configured to execute the software modules stored by the computer-readable storage medium.

15. The system of claim 14, wherein the system keeps a running total of time depleted from the service period during the service period.

16. The system of claim 14, wherein the computer is a disconnected client machine without server interaction during the service period.

17. The system of claim 14, wherein the number of computer cycles is the number of central processing unit cycles of the computer.

18. The system of claim 14, wherein the determination module calculates a total amount of time passed during each of the service lives plus the total amount of time elapsed between each of the service lives.

* * * * *